No. 687,038. Patented Nov. 19, 1901.
A. C. LINDGREN.
CULTIVATOR.
(Application filed Aug. 6, 1901.)
(No Model.) 3 Sheets—Sheet 1.

Witnesses Inventor
A. C. Lindgren
by P. T. Dodge
Attorney

No. 687,038. Patented Nov. 19, 1901.
A. C. LINDGREN.
CULTIVATOR.
(Application filed Aug. 6, 1901.)
(No Model.) 3 Sheets—Sheet 3.

UNITED STATES PATENT OFFICE.

ALEXUS C. LINDGREN, OF MOLINE, ILLINOIS, ASSIGNOR TO THE MOLINE PLOW COMPANY, A CORPORATION OF ILLINOIS.

CULTIVATOR.

SPECIFICATION forming part of Letters Patent No. 687,038, dated November 19, 1901.

Application filed August 6, 1901. Serial No. 71,080. (No model.)

*To all whom it may concern:*

Be it known that I, ALEXUS C. LINDGREN, of Moline, county of Rock Island, and State of Illinois, have invented a new and useful Improvement in Cultivators, of which the following is a specification.

This invention has reference to harrows or cultivators, the object being to adapt the machine for use particularly in tree-covered localities—such as orchards, vineyards, and the like—where the foliage overhangs the surface of the soil.

With this end in view the invention consists in the combination, with a sustaining-frame adapted to be raised and lowered, of a harrow or cultivator frame connected with the sustaining-frame by improved means and movable vertically with relation to it.

The invention consists also in the details of construction of parts hereinafter described and claimed.

Figure 1:
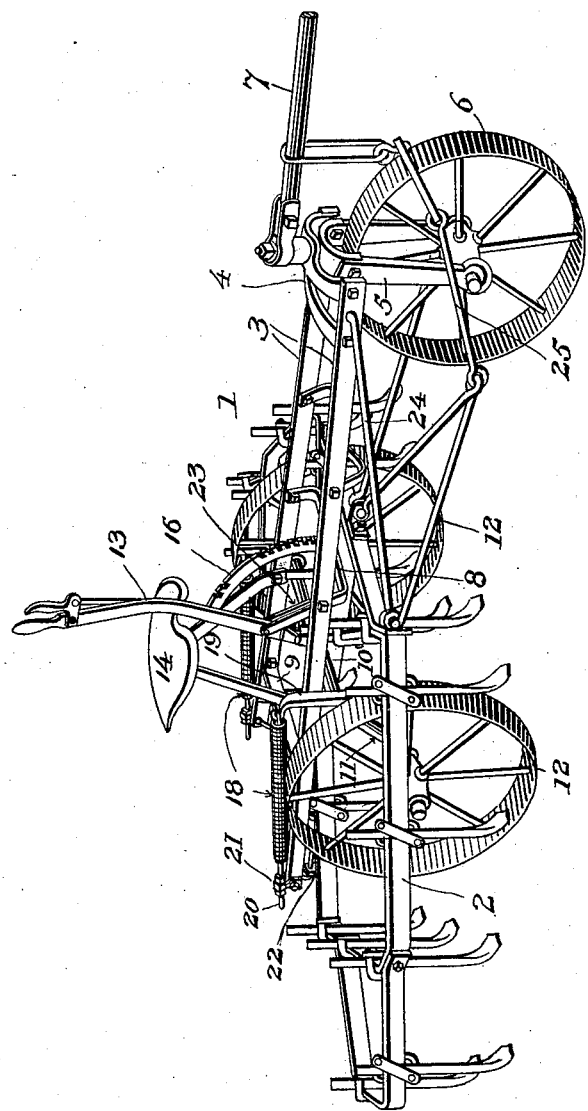
Figure 2:
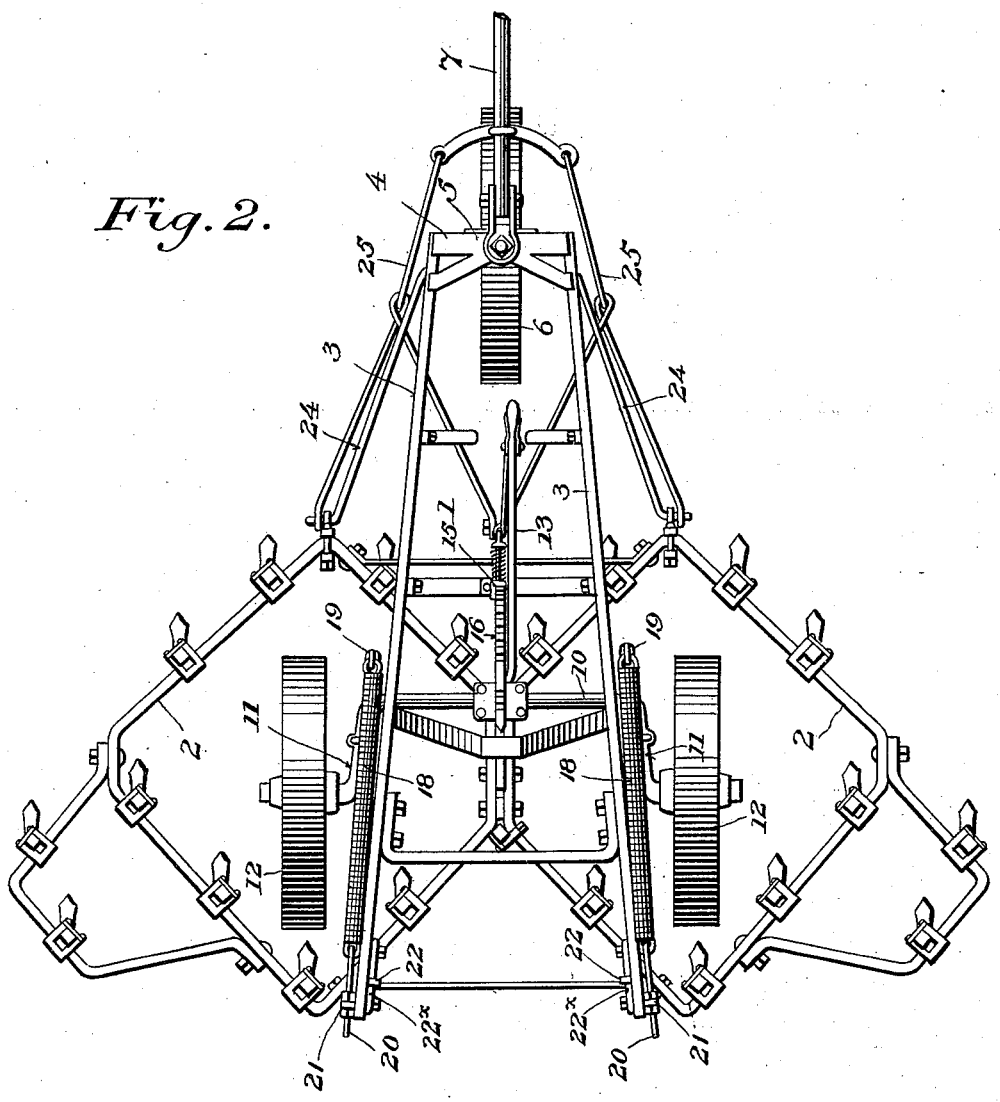
Figure 3:
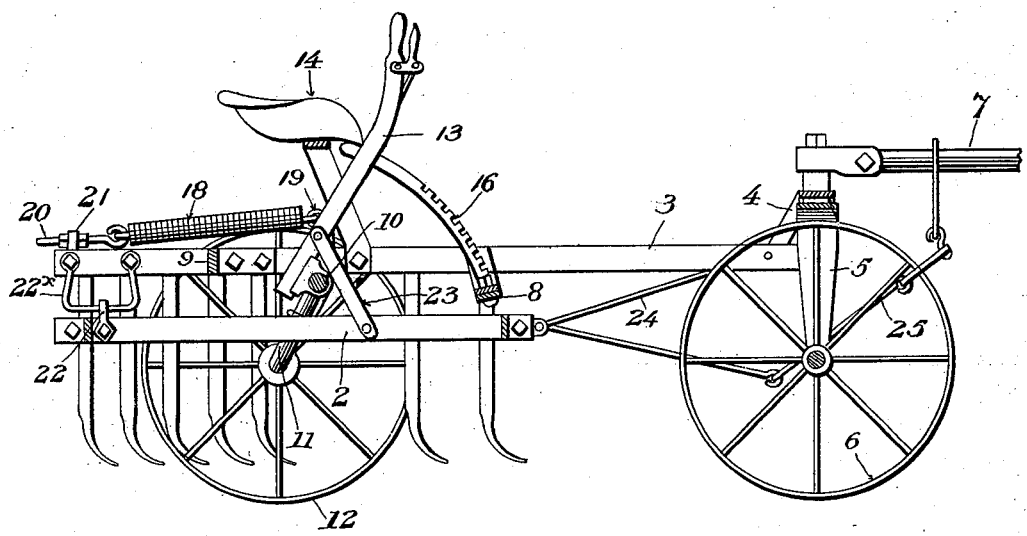
Figure 4:
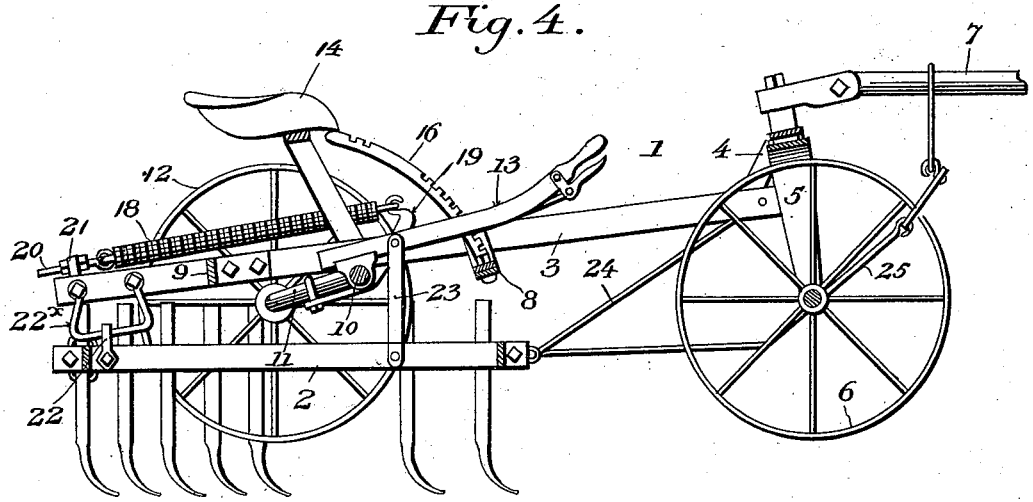

In the accompanying drawings, Figure 1 is a perspective view of my improved machine. Fig. 2 is a top plan view of the same. Fig. 3 is a longitudinal sectional elevation showing the parts raised to an inoperative position for transportation from field to field. Fig. 4 is a similar view with the parts lowered in an operative position.

Referring to the drawings, the machine comprises as its main features a wheeled frame 1, adjustable vertically at its rear end, so that it may be lowered near the ground, and a toothed frame 2 beneath the wheeled frame, jointed at its rear end to the wheeled frame and movable at its forward end vertically with relation thereto, so that when the rear end of the wheeled frame is lowered the toothed frame may be correspondingly lowered at its front end in order that when it enters the ground for action its level may be maintained.

The wheeled frame comprises two frame-bars 3, which converge toward their front ends, where they are joined together by an arched casting 4, through which extends a stem on the upper end of a vertical yoke 5, having mounted in its lower end a wheel 6, which gives support to the front end of the frame. A pole 7 is connected with the stem and serves to hold the wheel in the line of advance. The frame-bars are spaced apart and held in fixed relation by cross-bars 8 and 9, between which and about midway of the length of the frame is loosely mounted an axle 10, with its ends bent in the form of crank-arms 11, extending rearwardly at the outer sides of the frame-bars and provided with supporting ground-wheels 12, the arrangement being such that by rocking the axle the frame supported thereon will be raised or lowered at its rear end, turning on the axis of the front wheel as a center. The rocking of the axle is effected by a hand-lever 13, fixed thereto between the frame-bars adjacent to a driver's seat 14, supported by standards rising from the frame. This lever is provided with a locking-dog 15, arranged to engage a toothed segment-bar 16, extending upward from a cross-plate 8, fixed between the frame-bars in front of the axle. The relative arrangement of these parts is such that when the lever is pushed forward it will rock the axle and throw the crank-arms upward and rearward, thereby lowering the frame at its rear end and the driver's seat supported thereby to an inclined position, the lever when the parts are in this position extending horizontally between the frame-bars, as shown in Fig. 4, and free of any interference with the branches of trees. The weight of the frame and rider is counteracted by spiral springs 18, connected at their front ends to arms 19 on the axle and at their rear ends adjustably to the frame by means of threaded rods 20, screwed into lugs 21 on the ends of the frame-bars.

The toothed frame before alluded to is arranged beneath the wheeled frame and comprises in the present instance tooth-bars arranged in the form of two squares secured together at adjacent corners and inclosing the ground-wheels. The form of the frame, however, is of minor importance and may be modified to suit the fancy and conditions encountered in the practical operation of the machine. At its rear end the toothed frame is jointed to the wheeled frame by a sliding connection in the form of eyes 22 on the toothed frame encircling and sliding on longitudinal supports in the form of stirrups $22^\times$, depending from the rear ends of the frame-bars, the purpose of this connection being to admit of a longitudinal movement of the toothed frame as a whole and a vertical movement of its forward end with reference to the wheeled frame, as will be more fully explained hereinafter. Near its front end the toothed frame is connected with the hand-lever by means of a link 23, jointed at its lower end to the toothed frame and at its upper end to the lever, the arrangement being such that when the lever is pushed forward to lower the rear end of the wheeled frame, as before explained, the front end of the toothed frame will be simultaneously and correspondingly lowered by means of the link connection with the lever. The purpose of this action is to maintain the "level" of the toothed frame when in action notwithstanding the inclination of the wheeled frame due to the lowering of its rear end. When out of action when in transporting the machine, the hand-lever is raised and extends upward, as shown in Figs. 1 and 3, with the crank-arms extending in an upright position downward, the wheeled frame elevated, the front end of the toothed frame drawn up by the link closely beneath the wheeled frame and parallel to it. When now the harrow is to be adjusted for action, the hand-lever is pushed forward, which will simultaneously lower the rear end of the wheeled frame to an inclined position and lower the front end of the toothed frame, so that the wheeled frame and driver's seat will be as near the ground as possible, while the toothed frame will occupy a horizontal position with the cultivator or harrow teeth in action, the hand-lever extending horizontally between the frame-bars. In this position of the parts the machine may be operated to work in orchards, vineyards, or other localities where the foliage closely overhangs the ground and without discomfort to the driver or injury to the trees.

In order that the toothed frame may be prevented from shifting laterally at its front end with reference to the wheeled frame, it is connected to the wheeled frame by means of brace-rods 24, pivoted at their rear ends to the sides of the toothed frame and at their front ends to the sides of the wheeled frame adjacent to the front wheel. As a result of this pivotal connection of the two frames at this point, when the toothed frame is moved downwardly at its front end with reference to the wheeled frame it will move bodily forward a slight distance. This longitudinal movement is provided for by the sliding connection between the rear end of the toothed frame and the wheeled frame, as described. Draft-links 25 are attached to the forward end of the toothed frame and extend beyond the front wheel, where they are connected with a clevis, to which the draft may be hitched.

It is obvious that the machine may be used to cultivate the ground or harrow the same, and the expression "toothed frame" used throughout this specification is intended to include a frame with harrow-teeth, cultivator-blades, or other tools for working the ground, either to cultivate the crops or to prepare the ground for planting. It is also obvious that the machine may be used in localities other than orchards and vineyards, although the construction is specially adapted for such localities.

Having thus described my invention, what I claim is—

1. In combination with a sustaining-frame, a support for its forward end on which said frame may fulcrum, means for raising and lowering the rear end of the sustaining-frame, a toothed frame situated beneath the sustaining-frame and jointed at its rear end to the rear end of said frame and movable bodily with it when the sustaining-frame is raised or lowered, and means for moving the forward end of the toothed frame vertically with relation to the sustaining-frame; whereby when the sustaining-frame is lowered at its rear end the toothed frame will be lowered with it at this point and its forward end separated from the sustaining-frame in order to preserve the level of the toothed frame.

2. In combination with a wheeled frame, means for raising and lowering one end thereof, a toothed frame jointed to the wheeled frame at its vertically-movable end and held against vertical movement with relation to the same, and means for moving the opposite end of the toothed frame vertically with reference to the wheeled frame.

3. In combination with a wheeled frame, a support for the forward end of the same, means for raising and lowering its rear end, whereby the frame will fulcrum on its forward support, a toothed frame sustained beneath the wheeled frame, and means for preserving the "level" of the toothed frame without regard to the position of the wheeled frame.

4. In combination with a wheeled frame, means for raising and lowering its rear end, a toothed frame arranged beneath the wheeled frame and jointed to the rear end of the latter and held against vertical movement with relation to the same, and means for moving the opposite end of the toothed frame to and from the wheeled frame.

5. In combination with a wheeled frame, a toothed frame arranged beneath the same and jointed to its rear end and held against vertical movement with relation to the same and movable vertically at its opposite end with relation to the wheeled frame, and means for simultaneously lowering the rear end of the wheeled frame and the front end of the toothed frame to preserve the "level" of the latter.

6. In combination with a wheeled frame, means for moving its rear end downward to an inclined position, a toothed frame arranged beneath the wheeled frame and jointed to the rear end of the same, and means for separating the front end of the toothed frame from the wheeled frame simultaneously with and a distance equal to, the downward movement of the rear end of the wheeled frame.

7. In combination with the sustaining-frame a wheel supporting its forward end, a tongue jointed to the forward end of the sustaining-frame, a crank-axle mounted in the sustaining-frame and provided with ground-wheels, a toothed frame jointed to the rear end of the sustaining-frame, means for rocking the axle to lower the rear end of the sustaining-frame, and means controlled by the rocking of the axle for correspondingly lowering the front end of the toothed frame; whereby the level of the latter will be preserved notwithstanding the inclination of the sustaining-frame.

8. In combination with a sustaining-frame, a wheel sustaining the front end of the same, a crank-axle mounted on the frame, ground-wheels on the axle sustaining the rear end of the frame, a lever for rocking the axle, a toothed frame jointed to the rear end of the wheeled frame, and a connection between said lever and the toothed frame.

9. In combination with the wheeled frame, means for raising and lowering its rear end, a toothed frame arranged beneath it and having both a jointed and a sliding connection with the rear end of the wheeled frame, a rod pivoted at its front end to the wheeled frame and at its rear end to the toothed frame, and means for moving the front end of the toothed frame to and from the wheeled frame.

10. In combination with a sustaining-frame, a front wheel supporting the forward end of the same, a cranked axle mounted on said frame, ground-wheels mounted on the axle and supporting the rear end of the frame, a driver's seat adjacent to the axle, means for rocking the axle to lower the rear end of the frame, a toothed frame arranged under the sustaining-frame and having a jointed connection therewith in rear of the axle, and operative connections between the axle and forward end of the toothed frame for lowering the latter with reference to the sustaining-frame.

In testimony whereof I hereunto set my hand, this 5th day of June, 1901, in the presence of two attesting witnesses.

ALEXUS C. LINDGREN.

Witnesses:
WM. H. TAYLOR,
THEO. STARKS.